United States Patent
Kaneko (10) Patent No.: US 8,936,372 B2
(45) Date of Patent: Jan. 20, 2015

(54) DOOR MIRROR FOR VEHICLE

(75) Inventor: Yoshitaka Kaneko, Kiryu (JP)

(73) Assignee: Mitsuba Corporation, Gunma (JP)

( * ) Notice: Subject to any disclaimer, the term of this patent is extended or adjusted under 35 U.S.C. 154(b) by 112 days.

(21) Appl. No.: 13/635,948

(22) PCT Filed: Mar. 14, 2011

(86) PCT No.: PCT/JP2011/055890
§ 371 (c)(1),
(2), (4) Date: Sep. 19, 2012

(87) PCT Pub. No.: WO2011/118426
PCT Pub. Date: Sep. 29, 2011

(65) Prior Publication Data
US 2013/0010380 A1    Jan. 10, 2013

(30) Foreign Application Priority Data
Mar. 26, 2010 (JP) .................................. 2010-71378

(51) Int. Cl.
G02B 5/08 (2006.01)
G02B 7/18 (2006.01)
B60R 1/074 (2006.01)

(52) U.S. Cl.
CPC .................................... B60R 1/074 (2013.01)
USPC ........................................ 359/841; 359/844

(58) Field of Classification Search
None
See application file for complete search history.

(56) References Cited

U.S. PATENT DOCUMENTS

| | | | |
|---|---|---|---|
| 8,708,505 B2 * | 4/2014 | Iseki | 359/841 |
| 8,770,769 B2 * | 7/2014 | Suzuki | 359/871 |
| 2004/0012867 A1 | 1/2004 | Sakata | |

FOREIGN PATENT DOCUMENTS

| | | |
|---|---|---|
| JP | 8-2324 | 1/1996 |
| JP | 2004-9806 | 1/2004 |
| JP | 2007-76492 | 3/2007 |

OTHER PUBLICATIONS

International Search Report issued Jun. 7, 2011 in International (PCT) Application No. PCT/JP2011/055890.
English translation of International Preliminary Report on Patentability issued Oct. 23, 2012 in International (PCT) Application No. PCT/JP2011/055890.

* cited by examiner

*Primary Examiner* — Jade R Chwasz
(74) *Attorney, Agent, or Firm* — Wenderoth, Lind & Ponack, L.L.P.

(57) ABSTRACT

A door mirror for a vehicle includes a foldable unit to be provided turnably on a stay mounted to a vehicle-body side and a mirror housing for housing the foldable unit therein. A stopper of the foldable unit is configured to regulate a turning operation of the foldable unit by abutting a stopper receiver of the stay. The mirror housing includes positioning portion which is a cut out on the peripheral edge of the unit-mounting hole which fits over the stopper to connect the foldable unit and the mirror housing to each other in a predetermined positional relationship. The foldable unit and the mirror housing are configured such that screwing a setscrew into a screw-fixing hole of the foldable unit through the screw-insertion hole of the mirror housing, in a state in which a position portion is fitted over the stopper, attaches the foldable unit to the mirror housing.

11 Claims, 6 Drawing Sheets

DOOR MIRROR FOR VEHICLE

TECHNICAL FIELD

The present invention relates to a door mirror for a vehicle to be mounted to an automobile or the like, and more particularly, to a positioning structure for a foldable unit in a door mirror for an automobile.

BACKGROUND ART

Figure 5:
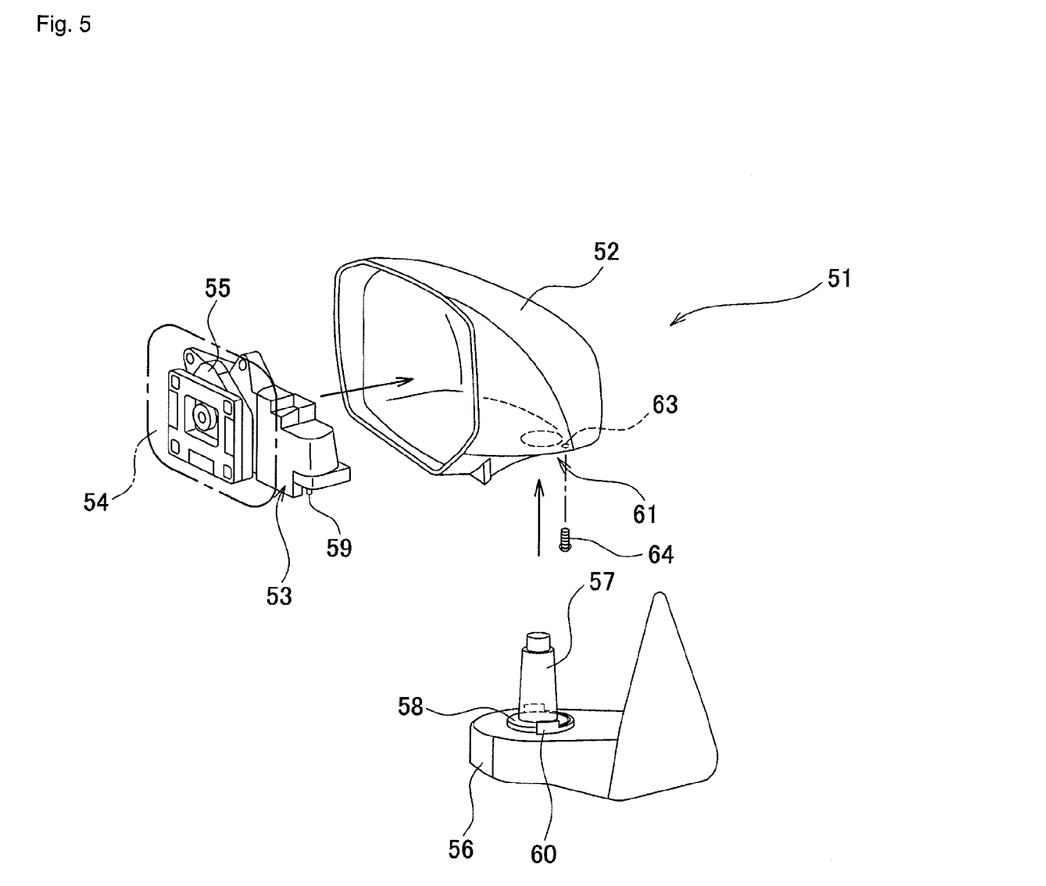
FIG. 5 An explanatory view illustrating a general structure of an automobile door mirror.

In general, a door mirror for a vehicle such as a door mirror for an automobile can be folded to a vehicle-body side and retained in this state, for parking or the like. FIG. 5 is an explanatory view illustrating a general structure of the automobile door mirror. As illustrated in FIG. 5, a foldable unit 53 is incorporated into a mirror housing 52 of a door mirror 51. A mirror 54 and a mirror-tilting mechanism 55 are mounted to the foldable unit 53. The foldable unit 53 is mounted onto a stay 56 mounted to the vehicle-body side. A setting plate 58 including a rotation pivot 57 is mounted to the stay 56. The foldable unit 53 is turnably mounted to the rotation pivot 57 located on the setting plate 58.

A stopper 59 is provided to the foldable unit 53 so as to stop and retain the door mirror 51 in a predetermined turning position. Corresponding to the stopper 59, a stopper receiver 60 is provided on the stay 56 side. The abutment of the stopper 59 against the stopper receiver 60 regulates a turning operation of the foldable unit 53. In the case of the door mirror 51, when the foldable unit 53 is folded to be located in a storing position (fallen position) for parking or the like, the stopper 59 comes into abutment against the stopper receiver 60. When the foldable unit 53 is unfolded to be located in a set position for use (standing position) for running or the like, the stopper 59 is fitted into a concave portion (not shown) provided on the stay 56 side. The fitting of the stopper 59 into the concave portion retains the foldable unit 53 in the predetermined standing position.

Figure 6:
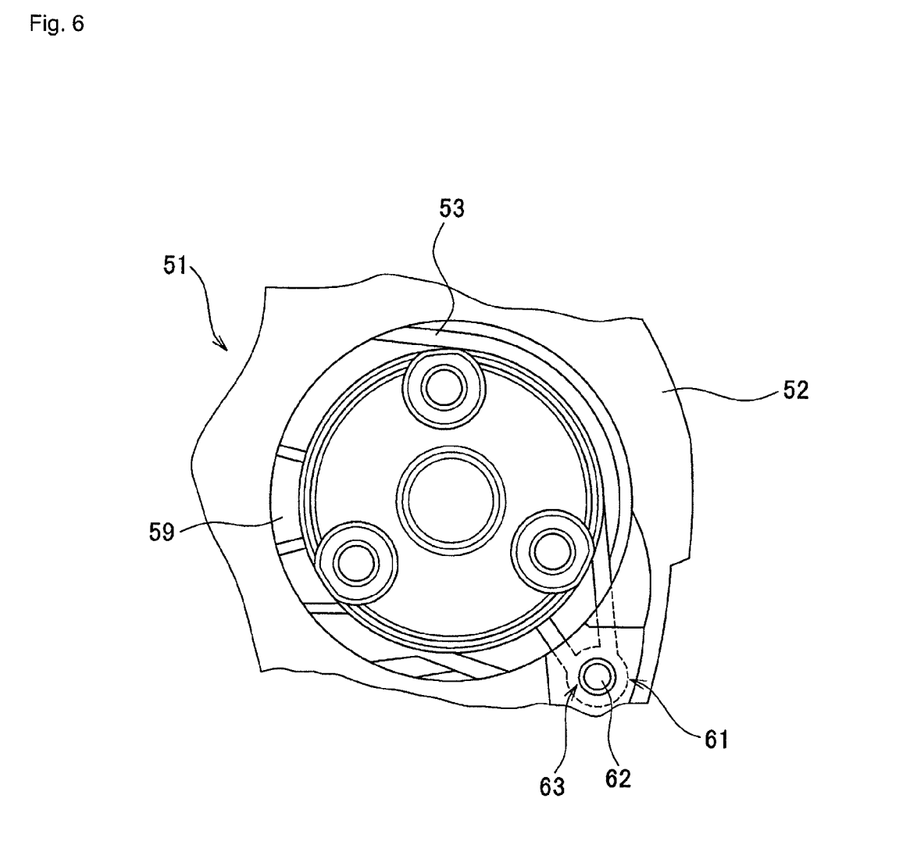
FIG. 6 An explanatory view illustrating a configuration of a screwing portion included in the door mirror illustrated in FIG. 5.

The mirror housing 52 is positioned and fixed with the foldable unit 53 in a predetermined positional relationship. The mirror housing 52 turns together with the foldable unit 53. For example, in the case of the door mirror 51 illustrated in FIG. 5, the mirror housing 52 and the foldable unit 53 are threadably fixed at a screwing portion 61. FIG. 6 is an explanatory view illustrating a configuration of the screwing portion 61. As illustrated in FIG. 6, the screwing portion 61 includes a screw-fixing hole 62 on the foldable unit 53 side and a screw-insertion hole 63 on the mirror housing 52 side. For fixing the foldable unit 53 to the mirror housing 52, the screw-fixing hole 62 and the screw-insertion hole 63 are aligned with each other. Next, a setscrew 64 such as a tapping screw is screwed into the screw-insertion hole 63 so as to fix the mirror housing 52 and the foldable unit 53 to each other.
Patent Document 1: Japanese Patent Application Laid-open No. Hei 08-2324

DISCLOSURE OF THE INVENTION

Problems to be Solved by the Invention

However, the conventional door mirror described above has a problem in that it is difficult to position the mirror housing and the foldable unit when the mirror housing and the foldable unit are to be fixed by the screw, and therefore the assembly thereof is difficult. For example, in the case of the door mirror 51 illustrated in FIG. 5, when the foldable unit 53 is to be fixed to the mirror housing 52 at the screwing portion 61, a screwing operation is required to be performed in a state in which the mirror housing and the foldable unit are in a free state. Therefore, the efforts are required for positional adjustment, and hence man-hours in an assembly operation tends to increase. Moreover, the foldable unit 53 is disadvantageously turned by a torque generated at the time of screw tightening. As a result, a positional shift is likely to be generated. If the positional shift is likely to be generated, the assembly operation is difficult to perform. In addition, there is a fear in that the screw is obliquely fixed with the presence of the positional shift. Therefore, at the time of the assembly of the foldable unit, innovative measures such as screw tightening with the regulation of the movement of the unit by a dedicated fixture or enlargement of an allowable range of the positional shift by reducing dimensional tolerances of other portions are required.

For example, if a positioning structure, in which a boss portion for positioning or the like is provided to the mirror housing 52 so that the boss portion or the like can be fitted into the foldable unit 53, is adopted, the positioning of the mirror housing and the foldable unit is facilitated. However, the mirror housing 52 has a complex three-dimensional structure. Therefore, a mold thereof is already extremely complex. In addition, in terms of a layout with other components, it is difficult to additionally provide the positioning structure in the vicinity of the rotation pivot 57.

It is an object of the present invention to realize a positioning structure for a mirror housing and a foldable unit to improve workability in assembly of the foldable unit and to prevent insufficient screwing without significantly modifying a conventional mold structure.

Means for Solving the Problems

According to the present invention, there is provided a door mirror for vehicle, including: a foldable unit to be provided turnably on a stay mounted to a vehicle-body side, a mirror housing for housing the foldable unit therein, and regulating a turning operation of the foldable unit by a stopper provided to the foldable unit and a stopper receiver provided to the stay, in which the mirror housing includes a positioning portion to be fitted over the stopper to connect the foldable unit and the mirror housing to each other in a predetermined positional relationship.

In the present invention, the stopper for regulating the turning operation of the foldable unit is fitted into the positioning portion provided to the mirror housing. In this manner, the mirror housing and the foldable unit are connected to each other in the predetermined positional relationship. In the door mirror of the present invention, the stopper has two functions, that is, a function of regulating the turning of the door mirror (stopper function) and a function of positioning the foldable unit. As a result, when the foldable unit is to be fixed to the mirror housing, a screwing operation can be performed in a state in which the foldable unit is locked against rotation. Therefore, workability is improved.

In the door mirror for vehicle, a turning portion to be mounted to a rotation pivot located on the stay may be provided to the foldable unit, while a unit-mounting hole, into which the turning portion is inserted, may be provided to the mirror housing, and the positioning portion may be formed at the peripheral edge of the unit-mounting hole. Further, a convex portion may be formed on the turning portion as the stopper, whereas a concave portion may be formed by cutting out the peripheral edge of the unit-mounting hole as the positioning portion.

Further, the mirror housing may be fixed to the foldable unit in a state in which the positioning portion is fitted over the stopper. In addition, the mirror housing and the foldable unit may be fixed by a setscrew. A screw-fixing hole, into which the setscrew is fixed, may be provided to the turning portion of the foldable unit, whereas a screw-insertion hole, into which the setscrew is inserted, may be provided to the mirror housing, and the screw-insertion hole may be located to face the screw-fixing hole when the turning portion is inserted into the unit-mounting hole while the positioning portion is fitted over the stopper.

Effects of the Invention

In the door mirror for vehicle of the present invention including the foldable unit to be provided turnably on the stay mounted to the vehicle-body side, the mirror housing for housing the foldable unit therein, and the stopper provided to the foldable unit, the stopper and the stopper receiver provided to the stay regulating the turning operation of the foldable unit, the mirror housing is provided with the positioning portion to be fitted over the stopper to connect the foldable unit and the mirror housing in the predetermined positional relationship. Therefore, when the foldable unit is to be fixed to the mirror housing, the screwing operation can be performed in a state in which the foldable unit is locked against rotation. Accordingly, workability in mounting of the foldable unit to the mirror housing is improved to enable the reduction of assembly man-hours.

EXPLANATION OF REFERENCE SYMBOLS

| 1  | door mirror            | 2   | mirror housing          |
|----|------------------------|-----|-------------------------|
| 3  | foldable unit          | 4   | mirror                  |
| 5  | mirror-tilting mechanism | 6 | bracket                 |
| 7  | pivot plate            | 8   | stay                    |
| 9  | setting plate          | 9a  | base surface            |
| 11 | turning portion        | 11a | lower end               |
| 12 | unit-mounting hole     | 13  | stopper                 |
| 14 | stopper receiver       | 15  | screw-fixing hole       |
| 16 | screw-insertion hole   | 17  | setscrew                |
| 21 | positioning portion    | 51  | door mirror             |
| 52 | mirror housing         | 53  | foldable unit           |
| 54 | mirror                 | 55  | mirror-tilting mechanism |
| 56 | stay                   | 57  | rotation pivot          |
| 58 | setting plate          | 59  | stopper                 |
| 60 | stopper receiver       | 61  | screwing portion        |

-continued

| 62 | screw-fixing hole | 63 | screw-insertion hole |
| 64 | setscrew          |    |                      |

BEST MODE FOR CARRYING OUT THE INVENTION

Figure 1:
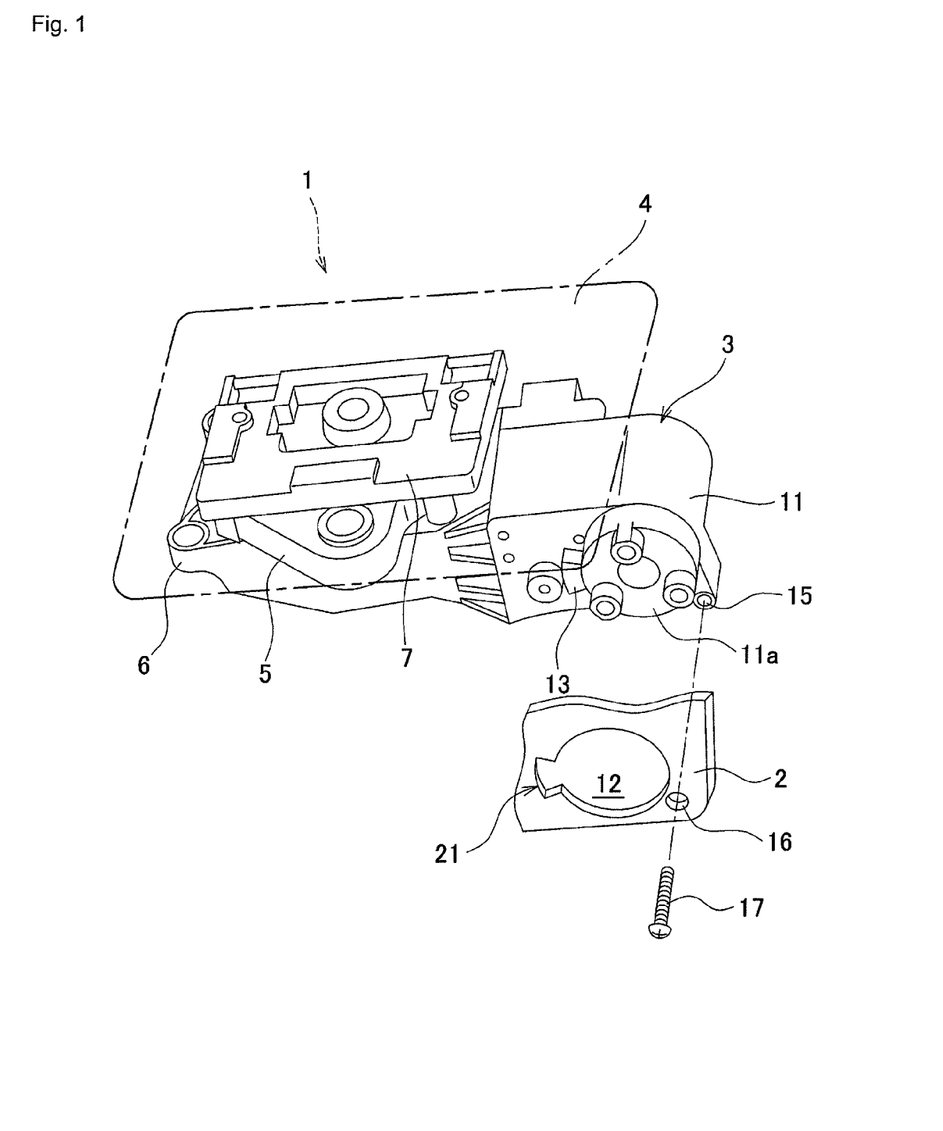
FIG. 1 An explanatory view illustrating a configuration of a foldable unit used in a door mirror according to an embodiment of the present invention.
Figure 2:
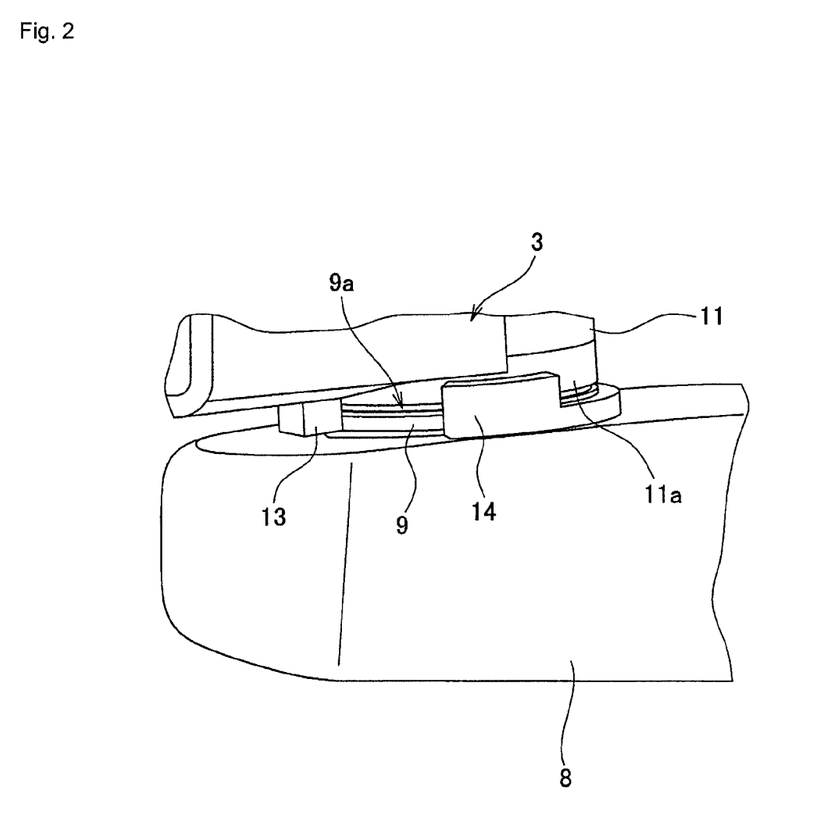
FIG. 2 An explanatory view illustrating a configuration of a portion, in which a mirror housing and the foldable unit are connected, included in the door mirror illustrated in FIG. 1.
Figure 3:
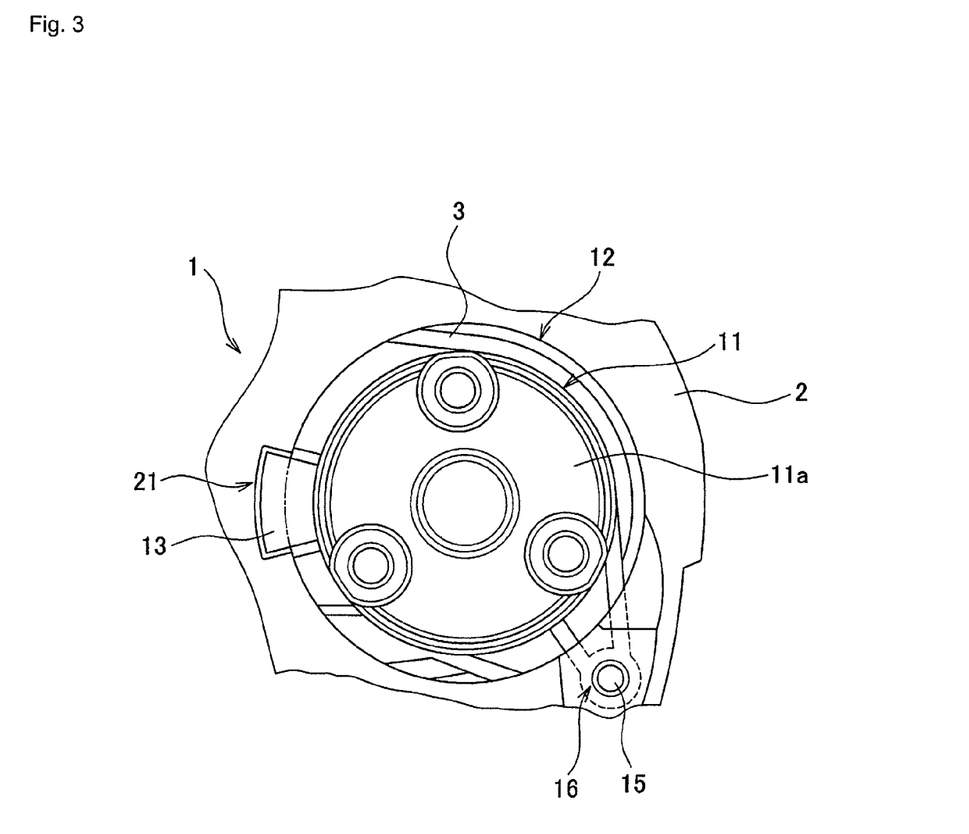
FIG. 3 Another explanatory view illustrating the configuration of the portion, in which the mirror housing and the foldable unit are connected, included in the door mirror illustrated in FIG. 1.

Hereinafter, an embodiment of the present invention is described in detail referring to the drawings. FIG. 1 is an explanatory view illustrating a configuration of a foldable unit used in a door mirror according to an embodiment of the present invention. FIGS. 2 and 3 are explanatory views, each illustrating a configuration of a portion, in which a mirror housing and the foldable unit are connected, included in the door mirror according to the embodiment of the present invention.

A door mirror 1 according to the present invention has the same configuration as that of the door mirror 51 illustrated in FIG. 5. A foldable unit 3 is incorporated into a mirror housing 2. As illustrated in FIG. 1, the foldable unit 3 includes a mirror 4 and a mirror-tilting mechanism 5. The mirror-tilting mechanism 5 is retained by a bracket 6. A pivot plate 7 is mounted tiltably to the mirror-tilting mechanism 5. The mirror 4 is fixed to the pivot plate 7. The bracket 6 is connected to a rotation pivot (not shown) provided on a stay 8 at a turning portion 11. The door mirror 1 has the same configuration as that of the door mirror 51 except for the portion, in which the mirror housing 2 and the foldable unit 3 are connected, illustrated in FIGS. 2 and 3.

As illustrated in FIG. 1, a unit-mounting hole 12 for mounting the foldable unit 3 is formed through a bottom of the mirror housing 2. When the foldable unit 3 is mounted to the mirror housing 2, a lower end 11a of the turning portion 11 of the bracket 6 projects from the unit-mounting hole 12. The foldable unit 3 coupled with the mirror housing 2 is mounted onto the stay 8. A setting plate 9 including the rotation pivot is mounted on the stay 8. The foldable unit 3 is turnably mounted to the rotation pivot located on the setting plate 9.

Figure 4:
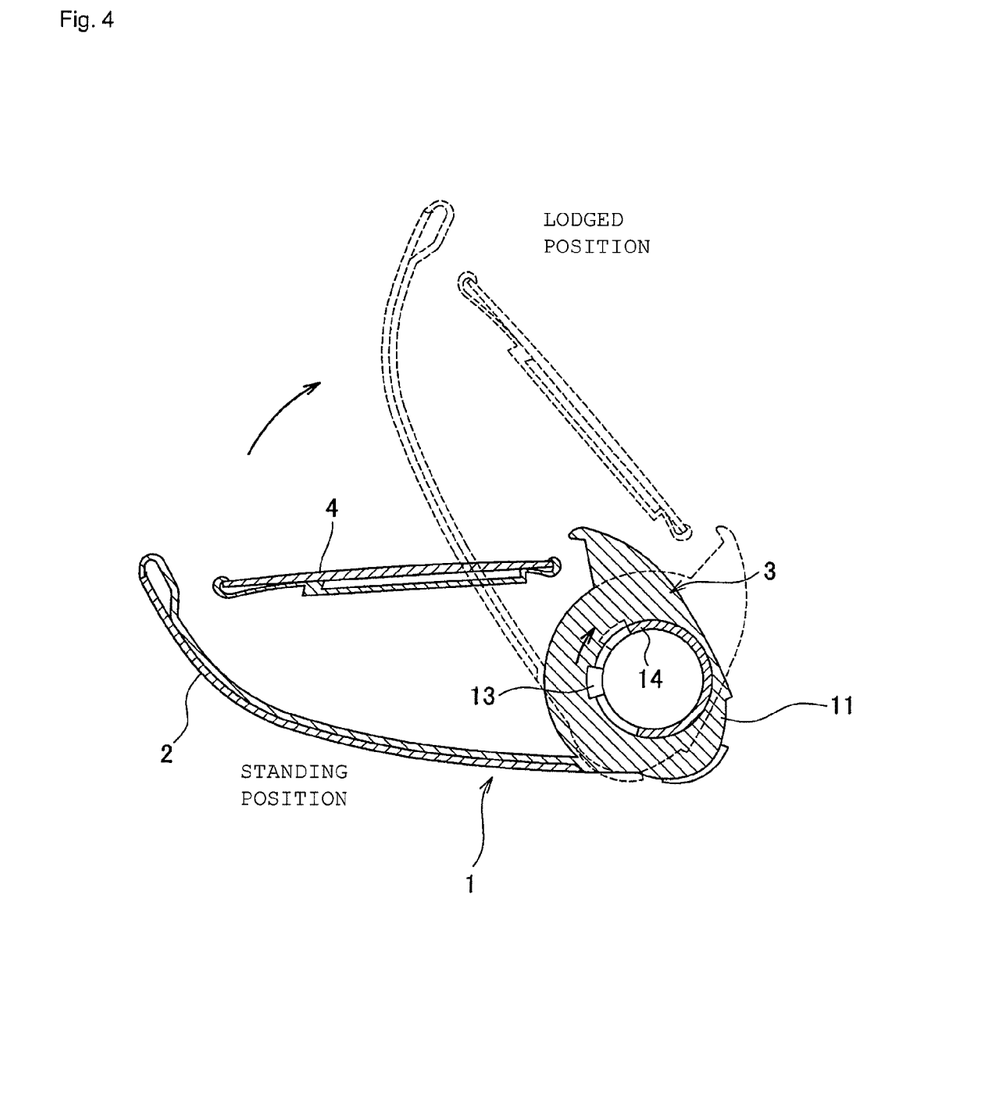
FIG. 4 An explanatory view illustrating a turning operation of the foldable unit.

When the foldable unit 3 is mounted onto the stay 8, the lower end 11a of the turning portion 11 comes into abutment against a base surface 9a of the setting plate 9, as illustrated in FIG. 2. In FIG. 2, for better understanding of a configuration of the connection portion, the mirror housing 2 is omitted. A stopper (convex portion) 13 is formed at the lower end 11a of the turning portion 11. The stopper 13 comes into abutment against a stopper receiver 14 provided on the stay 8. FIG. 4 is an explanatory view illustrating a turning operation of the foldable unit 3. As illustrated in FIG. 4, the stopper 13 comes into abutment against the stopper receiver 14. As a result, the turning operation (turning angle) of the foldable unit 3 is regulated at a fallen position.

In the vicinity of the turning portion 11, a screw-fixing hole 15 is provided. A screw-insertion hole 16 is formed in the vicinity of the unit-mounting hole 12 of the mirror housing 2 so as to correspond to the screw-fixing hole 15. When the foldable unit 3 is to be fixed to the mirror housing 2, the screw-fixing hole 15 and the screw-insertion hole 16 are aligned with each other while the turning portion 11 is inserted into the unit-mounting hole 12. Then, a setscrew 17 such as a tapping screw is screwed into the screw-fixing hole 15 through the screw-insertion hole 16. As a result, the mirror housing 2 and the foldable unit 3 are threadably fixed to each other.

As described above, in the case of the conventional door mirror, a screwing operation is required to be performed in a structure in which the mirror housing 2 and the foldable unit 3 are not positioned. Therefore, the operation is difficult to perform, and hence there is a fear of occurrence of insufficient screwing. Therefore, innovative measures such as the use of a dedicated fixture have been taken. However, the cost of products is inevitably increased due to an increase in assembly man-hours in the operation, the demand of high part accuracy, and the like. Therefore, focusing attention on the existing stopper 13 provided to regulate an operation of the mirror, the door mirror 1 of the present invention performs the positioning of the mirror housing 2 and the foldable unit 3 by using the existing stopper 13. By using the existing stopper 13, an assembly operation of the foldable unit 3 is facilitated, while the cost is reduced.

In the door mirror 1, the stopper 13 is formed to have a larger width in a radial direction than that of the conventional door mirror (a width of the stopper of the conventional door mirror is indicated by an alternate long and short dash line in FIG. 2). In addition, a positioning portion (concave portion) 21 is provided to a peripheral edge of the unit-mounting hole 12 so as to correspond to the stopper 13. As illustrated in FIG. 3, the positioning portion 21 is formed by cutting out a part of the peripheral edge of the unit-mounting hole 12. The positioning portion 21 is formed slightly larger than the stopper 13. The position of the positioning portion 21 is set so that the foldable unit 3 and the mirror housing 2 are positioned in a correct positional relationship when the stopper 13 is fitted thereto.

When the turning potion 11 is inserted into the unit-mounting hole 12 while the stopper 13 is aligned with the positioning portion 21, the foldable unit 3 and the mirror housing 2 are assembled in the correct positional relationship. Moreover, even for the screwing operation, the mirror housing 2 and the foldable unit 3 are not placed in a free state but are retained in the predetermined positional relationship. Specifically, the stopper 13 has two functions, that is, a turn-regulating function (stopper function) of the conventional door mirror and a function of positioning the foldable unit 3.

In the door mirror 1, when the foldable unit 3 is assembled to the mirror housing 2, the turning portion 11 is first inserted into the unit-mounting hole 12 while the stopper 13 is fitted into the positioning portion 21. Next, in a state in which the stopper 13 is fitted into the positioning portion 21, the screw-fixing hole 15 and the screw-insertion hole 16 are aligned with each other. Then, the setscrew 17 is screwed into the screw-fixing hole 15 through the screw-insertion hole 16. At this time, the stopper 13 is fitted into the positioning portion 21. Therefore, the screw-fixing hole 15 and the screw-insertion hole 16 are located in substantially aligned positions. Therefore, in contrast to the conventional door mirror, the alignment of the foldable unit and the mirror housing and the screwing operation become extremely easy.

Further, by the fitting of the stopper 13 into the positioning portion 21, the foldable unit 3 is connected in a locked state against rotation. Therefore, the turning of the foldable unit 3 by a driving torque of the setscrew, as happens in the conventional door mirror, does not occur. Thus, the screwing operation can be easily performed without using a dedicated fixture. As a result, the workability is improved, while man-hours in the assembly operation is reduced. Moreover, dimensional tolerances of other portions are not required to be reduced in order to enlarge the allowable range of the positional shift. The accuracy of the other parts is relaxed to reduce the fabrication cost.

Further, the stopper 13 is obtained based on the existing component. Therefore, the mold for fabricating the stopper 13 is easy to remodel. Moreover, the positioning portion 21 is provided to the peripheral edge of the unit-mounting hole 12. Therefore, significant remodeling of the mold is not required. The mold for the mirror housing 2 requires a complex structure using a slide or the like. However, the remodeling to provide the positioning portion 21 to the peripheral edge of the unit-mounting hole 12 is relatively easily achieved. Therefore, the cost for remodeling the mold is low. According to the present invention, the improvement of workability, the reduction of the number of defective products, and the like can be achieved at low cost.

The present invention is not limited to the above-mentioned embodiment. It is needless to say that various modifications can be made thereto without departing from the spirit of the present invention.

For example, the door mirror for vehicle according to the present invention is applicable to a power-folding type door mirror as well as to a manual-folding type door mirror. Further, the vehicle door mirror is also applicable to vehicles other than automobiles (for example, industrial vehicles such as construction machines and mining machines).

The invention claimed is:

1. A door mirror for a vehicle, the door mirror comprising:
a foldable unit to be provided turnably on a stay mounted to a vehicle-body side, said foldable unit including a stopper; and
a mirror housing for housing said foldable unit therein, said mirror housing having a unit-mounting hole therein;
wherein said stopper of said foldable unit is configured to regulate a turning operation of said foldable unit by abutting a stopper receiver of the stay,
wherein said foldable unit has:
a turning portion to be mounted to a rotation pivot provided to the stay, said turning portion having a lower end on a side of said turning portion closest to the stay, said lower end of said turning portion projecting through said unit-mounting hole when said foldable unit is mounted to said mirror housing,
said stopper formed at said lower end of said turning portion, and
a screw-fixing hole formed on a lower end face of said turning portion at an outside of said lower end of said turning portion,
wherein said mirror housing has:
said unit-mounting hole, through which said lower end of said turning portion is inserted,
a positioning portion formed at a peripheral edge of said unit-mounting hole, said positioning portion being a cut out on said peripheral edge of said unit-mounting hole which fits over said stopper to connect said foldable unit and said mirror housing to each other in a predetermined positional relationship, and
a screw-insertion hole formed adjacent to said unit-mounting hole and located so as to face said screw-fixing hole when said lower end of said turning portion is inserted into said unit-mounting hole while said positioning portion is fitted over said stopper, so that a setscrew inserted through said screw-insertion hole extends into said screw-fixing hole of said foldable unit,
wherein said foldable unit and said mirror housing are configured such that screwing said setscrew into said screw-fixing hole through said screw-insertion hole in a state in which said position portion is fitted over said stopper attaches said foldable unit to said mirror housing.

2. The door mirror of claim 1, wherein said positioning portion is formed slightly larger than said stopper, said foldable unit and said mirror housing are assembled in a correct positional relationship when said stopper is fitted to said positioning portion.

3. The door mirror of claim 1, wherein said stopper regulates a turning operation of said foldable unit and positions said foldable unit relative to said mirror housing.

4. The door mirror of claim 1, wherein said foldable unit is connected to said mirror housing in a locked state against rotation by fitting said stopper into said positioning portion, and said foldable unit does not turn by a driving torque of the setscrew.

5. The door mirror of claim 1, wherein said stopper is configured to limit a range of motion of said foldable unit by abutting the stopper receiver of the stay, and wherein said stopper fits through said positioning portion of said mirror housing in such a manner as to position and fix said foldable unit immovably relative to said mirror housing at a position in which said screw-fixing hole of said foldable unit is aligned with said screw-insertion hole of said mirror housing.

6. A door mirror assembly comprising:

a stay for being mounted to a vehicle, said stay including a stopper receiver;

a foldable unit to be provided turnably on said stay, said foldable unit including a stopper; and a mirror housing for housing said foldable unit therein, said mirror housing having a unit-mounting hole therein;

wherein said stopper of said foldable unit is configured to regulate a turning operation of said foldable unit by abutting said stopper receiver of said stay, wherein said foldable unit has:

a turning portion to be mounted to a rotation pivot provided to said stay, said turning portion having a lower end on a side of said turning portion closest to said stay, said lower end of said turning portion projecting through said unit-mounting hole when said foldable unit is mounted to said mirror housing, said stopper formed at said lower end of said turning portion, and a screw-fixing hole formed on a lower end face of said turning portion at an outside of said lower end of said turning portion, wherein said mirror housing has:

said unit-mounting hole, through which said lower end of said turning portion is inserted, a positioning portion formed at a peripheral edge of said unit-mounting hole, said positioning portion being a cut out on said peripheral edge of said unit-mounting hole which fits over said stopper to connect said foldable unit and said mirror housing to each other in a predetermined positional relationship, and a screw-insertion hole formed adjacent to said unit-mounting hole and located so as to face said screw-fixing hole when said lower end of said turning portion is inserted into said unit-mounting hole while said positioning portion is fitted over said stopper, so that a setscrew inserted through said screw-insertion hole extends into said screw-fixing hole of said foldable unit, wherein said foldable unit and said mirror housing are configured such that screwing said setscrew into said screw-fixing hole through said screw-insertion hole in a state in which said position portion is fitted over said stopper attaches said foldable unit to said mirror housing.

7. The door mirror assembly of claim 6, wherein said positioning portion is formed slightly larger than said stopper, said foldable unit and said mirror housing are assembled in a correct positional relationship when said stopper is fitted to said positioning portion.

8. The door mirror assembly of claim 6, wherein said stopper regulates a turning operation of said foldable unit and positions said foldable unit relative to said mirror housing.

9. The door mirror assembly of claim 6, wherein said foldable unit is connected to said mirror housing in a locked state against rotation by fitting said stopper into said positioning portion, and said foldable unit does not turn by a driving torque of the setscrew.

10. The door mirror assembly of claim 6, wherein said stopper is configured to limit a range of motion of said foldable unit by abutting said stopper receiver of said stay, and wherein said stopper fits through said positioning portion of said mirror housing in such a manner as to position and fix said foldable unit immovably relative to said mirror housing at a position in which said screw-fixing hole of said foldable unit is aligned with said screw-insertion hole of said mirror housing.

11. The door mirror assembly of claim 6, wherein the foldable unit is turnably mounted to the stay in an arrangement in which turning the foldable unit brings the stopper into abutment with the stopper receiver, wherein said stopper limits a range of motion of said foldable unit by abutting said stopper receiver of said stay, and wherein said stopper is disposed in and extends through said positioning portion of said mirror housing such that said foldable unit is fixed immovably relative to said mirror housing at a position in which said screw-fixing hole of said foldable unit is aligned with said screw-insertion hole of said mirror housing.

* * * * *